United States Patent
McKinney

(10) Patent No.: US 8,966,877 B2
(45) Date of Patent: Mar. 3, 2015

(54) GAS TURBINE COMBUSTOR WITH VARIABLE AIRFLOW

(75) Inventor: Randal G. McKinney, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 1106 days.

(21) Appl. No.: 12/696,311

(22) Filed: Jan. 29, 2010

(65) Prior Publication Data

US 2011/0185736 A1    Aug. 4, 2011

(51) Int. Cl.
*F02C 7/057* (2006.01)
*F23R 3/06* (2006.01)
*F23R 3/10* (2006.01)

(52) U.S. Cl.
CPC ... *F23R 3/06* (2013.01); *F23R 3/10* (2013.01); Y02T 50/675 (2013.01)
USPC ............................. 60/39.23; 60/751; 60/752

(58) Field of Classification Search
USPC ........................................ 60/751–760, 39.23
See application file for complete search history.

(56) References Cited

U.S. PATENT DOCUMENTS

| | | | |
|---|---|---|---|
| 4,030,875 A | 6/1977 | Grondahl et al. | |
| 4,104,874 A | 8/1978 | Caruel et al. | |
| 5,220,795 A | 6/1993 | Dodds et al. | |
| 5,435,139 A | 7/1995 | Pidcock et al. | |
| 5,628,192 A | 5/1997 | Hayes-Bradley et al. | |
| 5,640,851 A | 6/1997 | Toon et al. | |
| 5,758,503 A | 6/1998 | DuBell et al. | |
| 5,782,294 A | 7/1998 | Froemming et al. | |
| 5,797,267 A | 8/1998 | Richards | |
| 5,934,067 A | 8/1999 | Ansart et al. | |
| 5,983,642 A | 11/1999 | Parker et al. | |
| 6,047,539 A | 4/2000 | Farmer | |
| 6,070,412 A | 6/2000 | Ansart et al. | |
| 6,182,451 B1 | 2/2001 | Hadder | |
| 6,189,814 B1 | 2/2001 | Richards | |
| 6,240,731 B1 | 6/2001 | Hoke et al. | |
| 6,378,286 B2 | 4/2002 | Vermes et al. | |
| 6,470,685 B2 | 10/2002 | Pidcock et al. | |
| 6,571,566 B1 | 6/2003 | Temple et al. | |
| 6,606,861 B2 | 8/2003 | Snyder | |
| 6,701,714 B2 | 3/2004 | Burd et al. | |
| 6,763,664 B2 | 7/2004 | Aoyama | |
| 6,810,673 B2 | 11/2004 | Snyder | |
| 7,093,439 B2 | 8/2006 | Pacheco-Tougas et al. | |
| 7,093,441 B2 | 8/2006 | Burd et al. | |
| 7,200,986 B2 * | 4/2007 | Sanders ....................... | 60/39.23 |
| 2002/0116929 A1 | 8/2002 | Snyder | |

(Continued)

FOREIGN PATENT DOCUMENTS

WO    WO-2008127437 A2    10/2008

*Primary Examiner* — Gerald L Sung
*Assistant Examiner* — Scott Walthour
(74) *Attorney, Agent, or Firm* — Miller, Matthias & Hull LLP

(57) ABSTRACT

An annular combustor and a method for operating a gas turbine engine over a power demand range facilitate combustion in a lean direct ignition (LDI) mode over an extended range of operating fuel air ratios. The flow primary combustion air admitted into the primary combustion zone is varied in response to power demand from a maximum air flow rate of high power demand to a minimum flow air rate of low power demand, while the flow of dilution air into a quench zone downstream of the primary combustion zone is increased from a minimum air flow rate at high power demand to a maximum air flow rate at low power demand.

10 Claims, 3 Drawing Sheets

(56) References Cited

U.S. PATENT DOCUMENTS

| | | |
|---|---|---|
| 2003/0061817 A1 | 4/2003 | Aoyama |
| 2003/0101731 A1 | 6/2003 | Burd et al. |
| 2003/0167771 A1 | 9/2003 | Hayashi et al. |
| 2003/0213250 A1 | 11/2003 | Pacheco-Tougas et al. |
| 2003/0233832 A1 | 12/2003 | Martling et al. |
| 2004/0006995 A1 | 1/2004 | Snyder |
| 2004/0226299 A1 | 11/2004 | Drnevich |
| 2004/0231333 A1 | 11/2004 | Tiemann |
| 2005/0022531 A1 | 2/2005 | Burd |
| 2005/0086940 A1 | 4/2005 | Coughlan et al. |
| 2005/0086944 A1 | 4/2005 | Cowan |
| 2007/0193274 A1* | 8/2007 | Belsom ............ 60/773 |
| 2008/0006033 A1* | 1/2008 | Scarinci et al. ........ 60/776 |
| 2008/0127651 A1* | 6/2008 | Zupanc et al. ........ 60/752 |

* cited by examiner

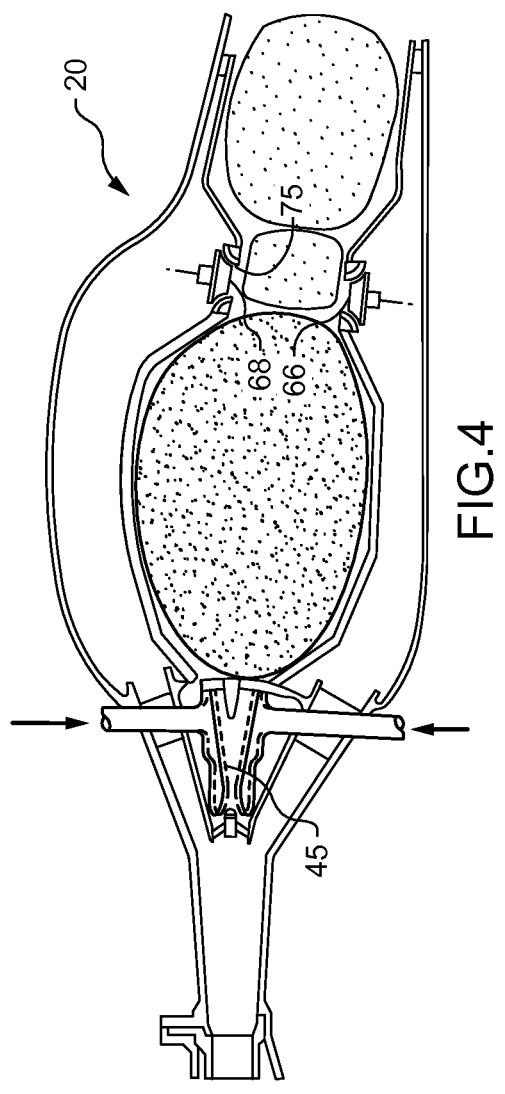
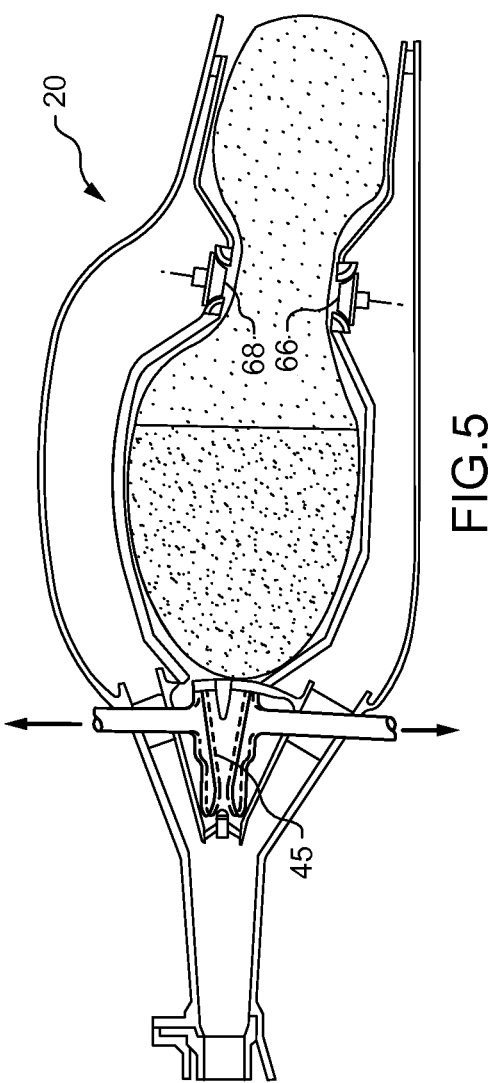

GAS TURBINE COMBUSTOR WITH VARIABLE AIRFLOW

FIELD OF THE INVENTION

This invention relates generally to gas turbine engines and, more particularly, to an annular combustor with variable airflow and a method for operating a combustor in a gas turbine engine.

BACKGROUND OF THE INVENTION

Gas turbine engines, such as those used to power modern commercial aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor.

An exemplary combustor features an annular combustion chamber defined between a radially inboard liner and a radially outboard liner extending aft from a forward bulkhead. The radially outboard liner extends circumferentially about and is radially spaced from the inboard liner, with the combustion chamber extending fore to aft therebetween. Exemplary liners are double structured, having an inner heat shield and an outer shell. A plurality of circumferentially distributed fuel injectors and associated swirlers or air passages is mounted in the forward bulkhead. The fuel injectors project into the forward end of the annular combustion chamber to supply the fuel to be combusted. The swirlers impart a swirl to primary combustion air entering the forward end of the combustion chamber at the bulkhead to provide rapid mixing of the fuel and combustion air. One or more rows of circumferentially distributed combustion air holes that penetrate the outboard liner and the inboard liner at one or more axial locations may be provided to admit additional air into the combustion chamber along the length of the combustion chamber. Commonly assigned U.S. Pat. Nos. 7,093,441; 6,606,861 and 6,810,673, the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. Accordingly, engine manufacturers strive to minimize NOx emissions. One combustion strategy for minimizing NOx emissions from gas turbine engines is commonly referred to as lean direct injection (LDI) combustion. The LDI combustion strategy recognizes that the conditions for NOx formation are most favorable at elevated combustion flame temperatures, i.e. when the fuel-air ratio is at or near stoichiometric.

In LDI combustion, more than the stoichiometric amount of air required for combustion of the fuel is injected into the forward region of the combustion chamber and rapidly mixed with the fuel to combust via a fuel-lean, as opposed to fuel-rich, process. A combustor configured for LDI combustion includes two serially arranged combustion zones: an overall fuel-lean combustion zone at the forward end of the combustor in which fuel and air are initially mixed followed by additional lean-burn combustion and mixing supported by dilution or cooling air addition in the axially aft portion of the combustor. The combustion process in a combustor configured for LDI combustion, by design intent, exists in one bulk governing state in which combustion is exclusively stoichiometric fuel lean. Clearly, local conditions may not be lean given that mixing of the fuel and air require some finite time and spatial volume via mixing to achieve this state. However, overall combustion occurs under fuel lean conditions, that is at an equivalence ratio less than 1.0. The substantial excess of air in the forward combustion zone inhibits NOx formation by suppressing the combustion flame temperature.

In gas turbine operations, the overall combustion fuel air ratio is determined by the power demand on the engine. At low power demand, the combustor is fired at a relatively low fuel air ratio. At high power demand, the combustor is fired at a relatively high fuel air ratio. Adjustment of the fuel air ratio in response to power demand is achieved by varying the amount of fuel delivered through the fuel injectors and injected into the forward region of the combustion chamber while maintaining the amount of airflow admitted into the forward region of the combustion chamber. The capability of operating gas turbine engines having conventional combustors with LDI combustion has proved to be somewhat limited at low fuel air ratios due to reduced combustion efficiency and fuel lean combustion stability concerns.

SUMMARY OF THE INVENTION

An annular combustor for a gas turbine engine is provided that facilitates combustion in a lean direct ignition (LDI) mode over an extended range of operating fuel air ratios. A method is also provided for operating a gas turbine engine over a power demand range that facilitates combustion in a lean direct ignition (LDI) mode over an extended range of operating fuel air ratios.

An annular combustor for a gas turbine engine includes: an inboard liner extending circumferentially and extending longitudinally fore to aft; an outboard liner extending circumferentially and extending longitudinally fore to aft and circumscribing the inboard liner; a bulkhead extending between a forward end of the inboard liner and a forward end of the outboard liner and in cooperation with the inboard liner and the outboard liner defining the annular combustion chamber; a plurality of primary combustion air admission nozzles opening through the bulkhead for admitting air into a forward region of the annular combustion chamber: and a plurality of dilution air admission holes are provided in at least one of the inboard liner and the outboard liner. Each air admission nozzle of the plurality of air admission nozzles has a selectively variable flow area geometry and each dilution air admission hole of the plurality of dilution air admission holes has a selectively variable flow area geometry.

In an embodiment, each air admission nozzle has a selectively variable flow area geometry that may be varied from a maximum airflow area at high power demand to a minimum airflow area at low power demand. In an embodiment, each air admission nozzle has a selectively variable flow area geometry that is continuously variable from a maximum airflow area at high power demand to a minimum airflow area at low power demand. In an embodiment, each air admission nozzle has a selectively variable flow area geometry that is step-wise variable from a maximum airflow area at high power demand to a minimum airflow area at low power demand through at least one intermediate airflow area at an intermediate power demand.

A method is provided for operating a gas turbine engine over a power demand range having a low power demand, an intermediate power demand and a high power demand, the gas turbine engine including a combustor defining a combustion chamber having a primary combustion zone and a quench zone downstream of the primary combustion zone. The method includes the steps of: admitting a substantially constant amount of combustion air into the combustion chamber irrespective of power demand; at low power demand, admitting about one-half of that combustion air into the primary combustion zone and admitting about one-half of that combustion air into the quench zone; and at high power demand, admitting substantially all of that combustion air into the primary combustion zone and admitting substantially none of said combustion air into the quench zone. The method may include the further the step of: at the intermediate power demand admitting about five-sevenths of that combustion air into the primary combustion zone and admitting about two-sevenths of that combustion air into the quench zone.

A method is also provided for operating a gas turbine engine over a power demand range having a low power demand, an intermediate power demand and a high power demand, the gas turbine engine including an annular combustor having an inboard liner, an outboard liner circumscribing the inboard liner, and a bulkhead extending between a forward end of the inboard liner and a forward end of the outboard liner and in cooperation with the inboard liner and the outboard liner defining an annular combustion chamber. The method includes the steps of: providing a plurality of primary combustion air admission nozzles opening through the bulkhead having a selectively variable flow area geometry for admitting air into a forward region of the annular combustion chamber; providing a plurality of dilution air admission holes having a selectively variable flow area geometry in at least one of the inboard liner and the outboard liner; and selectively adjusting the variable flow area geometry of plurality of primary combustion air admission nozzles and selectively adjusting the variable flow area geometry of the dilution air admission holes in response to power demand.

The step of selectively adjusting the variable flow area geometry of plurality of primary combustion air admission nozzles and selectively adjusting the variable flow area geometry in response to power demand may include the step of: at high power demand, adjusting the variable flow area geometry of each primary combustion air admission nozzle to a maximum flow area and adjusting the variable flow area geometry of each dilution air admission hole to a minimum flow area. The step of selectively adjusting the variable flow area geometry of plurality of primary combustion air admission nozzles and selectively adjusting the variable flow area geometry in response to power demand may include the step of: at low power demand, adjusting the variable flow area geometry of each primary combustion air admission nozzle to a minimum flow area and adjusting the variable flow area geometry of each dilution air admission hole to a maximum flow area. The step of selectively adjusting the variable flow area geometry of plurality of primary combustion air admission nozzles and selectively adjusting the variable flow area geometry in response to power demand may include the step of: at intermediate power demand, adjusting the variable flow area geometry of each primary combustion air admission nozzle to an intermediate flow area and adjusting the variable flow area geometry of each dilution air admission hole to a intermediate flow area.

BRIEF DESCRIPTION OF THE DRAWINGS

For a further understanding of the disclosure, reference will be made to the following detailed description which is to be read in connection with the accompanying drawing, where:

FIG. 4 is a sectioned side elevation view of the exemplary annular combustor of FIG. 2 illustrated as operating in a low power demand mode; and FIG. 5 is a sectioned side elevation view of the exemplary annular combustor of FIG. 2 illustrated as operating in a high power demand mode.

DETAILED DESCRIPTION OF THE INVENTION

Figure 1:
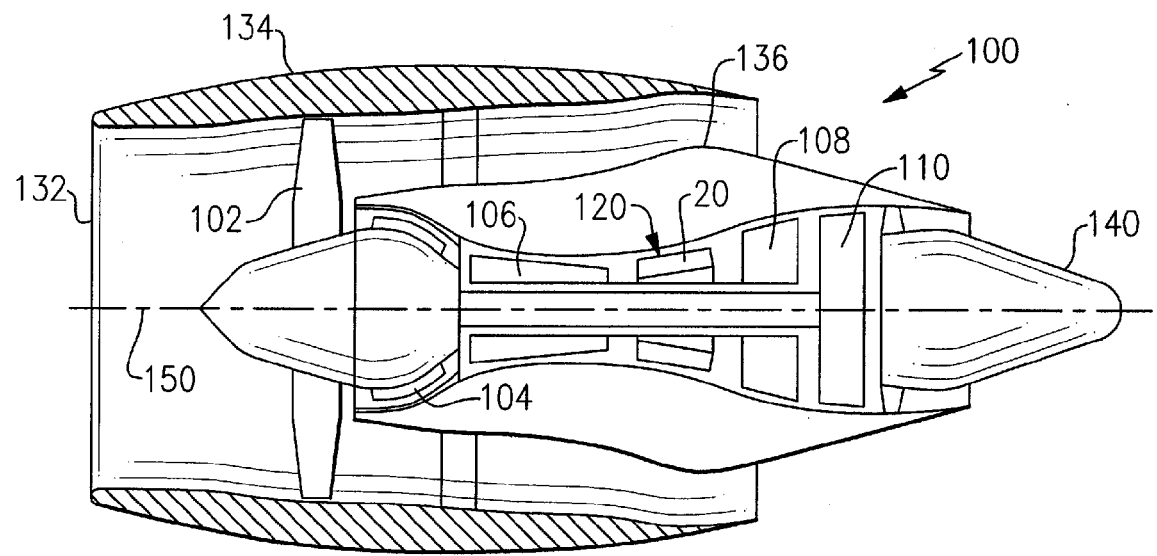
FIG. 1 is a schematic view of a longitudinal section of an exemplary embodiment of a turbofan gas turbine engine.

Referring now in FIG. 1, there is shown an exemplary embodiment of a turbofan gas turbine engine, designated generally as 100, that includes, from fore-to-aft longitudinally about a central engine axis 150, a fan 102, a low pressure compressor 104, a high pressure compressor 106, a combustor module 120, a high pressure turbine 108, and a low pressure turbine 110. A nacelle forms a housing or wrap that surrounds the gas turbine engine 100 to provide an aerodynamic housing about gas turbine engine. In the turbofan gas turbine engine 100 depicted in the drawings, the nacelle includes, from fore to aft, the engine inlet 132, the fan cowl 134, the engine core cowl 136 and the primary exhaust nozzle 140. It is to be understood that the annular combustor 120 as disclosed herein is not limited in application to the depicted embodiment of a gas turbine engine, but is applicable to other types of gas turbine engines, including other types of aircraft gas turbine engines, as well as industrial and power generation gas turbine engines.

Referring now to FIGS. 2-5, the combustor module 120 includes an annular combustor 20 which is disposed about the engine axis 150 in an annular pressure vessel 80 defined by a radially inner case 82 and a radially outer case 84. The annular combustor 20 includes a radially inboard liner 32, a radially outboard liner 34 that circumscribes the inboard liner 32, and a forward bulkhead 36. The bulkhead 36 extends between the respective forward end of the inboard liner 32 and the forward end of the outboard liner 34. The inboard liner 32 and the outboard liner 34 extend longitudinally fore-to-aft from the forward bulkhead 36 to the combustor exit. Collectively, the inboard liner 32, the outboard liner 34 and the forward bulkhead 36 bound the annular combustion chamber 30.

Figure 3:
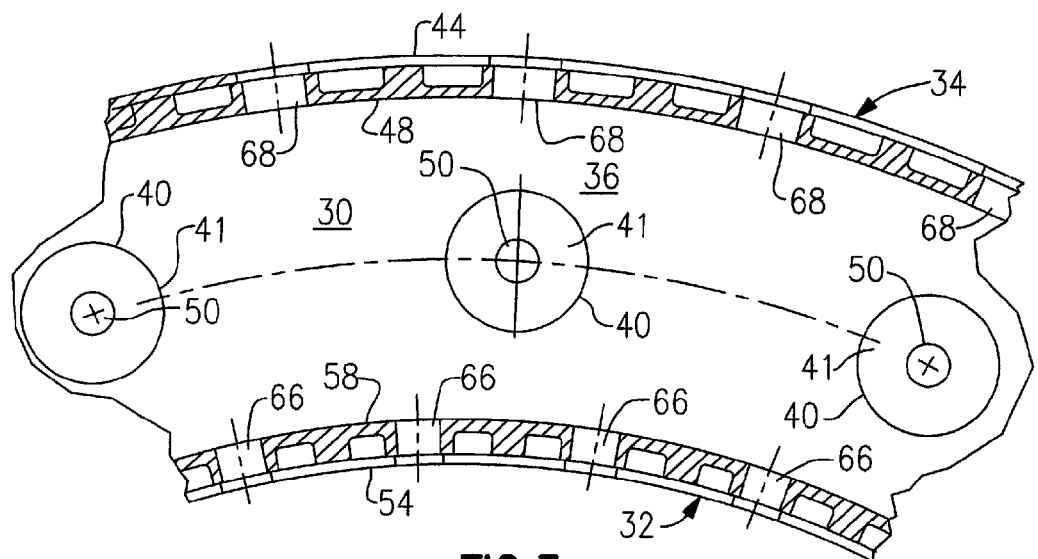
FIG. 3 is an elevation view of the annular combustor of FIG. 2 from within the combustion chamber taken substantially along line 3-3 looking forward.

Referring now also to FIG. 3 in particular, the forward bulkhead 36 carries a plurality of combustion air admission nozzles 40 and an associated plurality of fuel injectors 50, for example typically from 12 to 24 depending upon the size of the engine, disposed in a circumferential array at spaced intervals about the annular combustion chamber 30. Each combustion air admission nozzle 40 includes an air passage 41 surrounding an associated fuel injector 50 that extends along the centerline of the combustion air admission nozzle 40. Each fuel injector 50 connects in flow communication with a fuel supply tube 52 that extends through the outer case 84 to convey fuel from an external source to the associated fuel injector 50. The air passage 41 may have a swirler 42 associated therewith as depicted in the exemplary embodiment, for imparting a swirl to the air passing from the air passage 41 into the combustion chamber about the associated fuel injector 50 to facilitate mixing of the fuel and air.

In operation, pressurized air from the compressor is decelerated as it passes through a diffuser section 112 connecting the outlet of the high pressure compressor to the annular combustor 20. A portion of the pressurized air is directed into the annular plenums 90, 92 defined within the annular pressure vessel 80, the annular plenum 90 extending circumferentially along and radially inwardly of the inboard liner 32 and the annular plenum 92 extending circumferentially about and radially outwardly of the outboard liner 34. A portion of this pressured air passes into the combustion chamber 30 through the air passages 41. Each swirler 42 imparts a spin to the air passing therethrough to provide rapid mixing of this air with the fuel being injected through the associated fuel injector 50 to promote initial combustion of the fuel in a fuel-lean state in a forward portion of the combustion chamber.

In the annular combustor 20 disclosed herein, at least one of the inboard liner 32 and the outboard liner 34 includes a plurality of dilution air admission holes penetrating therethrough for admitting dilution air into a quench zone located within the combustion chamber and interfacing with the downstream extreme of the primary combustion zone. The dilution air admission holes 66 in the inner liner 32 may be arranged in at least one row extending circumferentially about the inner liner 32 and the dilution air admission holes 68 may be arranged in at least one row extending circumferentially about the outer liner 34. In the exemplary embodiment depicted in FIGS. 2-5, each of the inner and outer liners 32, 34 each includes a plurality of relatively large diameter dilution air admission holes 66, 68 penetrating through the inner liner 32 and the outer liner 34, respectively, at the forward end of the aft section thereof arrayed in a single circumferential row about the circumferences of the inboard and outboard liners 32, 34, respectively. The dilution air admission holes 66, 68 may be spaced apart at equal arc distances with the holes 66 offset circumferentially from the holes 68 illustrated in the exemplary embodiments depicted in FIG. 3. If additional dilution air admission holes 66 or 68 are required, the additional holes may be arrayed in a second circumferentially extending row (not shown) in the inner liner 32 and the outer liner 34, respectively, spaced axially downstream from the first row of dilution air admission holes.

In a lean direct injection (LDI) combustion mode, the portion air admitted to the combustion chamber 30 as primary is increased to an amount significantly greater than the amount of air required for stoichiometric combustion of the fuel injected through the fuel nozzles 40. Thus, combustion in the forward section of the combustion chamber occurs, on a spatial average, under fuel lean conditions, although local pockets of stoichiometric variability and combustion are likely. The overall fuel-lean stoichiometry of the fuel-air mixture in such a lean burn zone produces a relatively cool flame, thus reducing excessive NOx formation. As the combustion products from this fuel lean burn primary combustion zone pass downstream into the aft section of the combustion chamber 30, the combustion products are further mixed out and/or diluted in a quench zone by the dilution air passing through the dilution air admission holes 66, 68 from the plenum 90, 92, respectively, to penetrate radially inwardly in the combustion products to both optimize the spatial temperature profile of the combustion products at the combustion chamber exit plane 35 and to prevent excessive NOx formation in the primary combustion zone upstream of the dilution air admission holes 66, 68.

The inboard liner 32 and the outboard liner 34 may be perforated with a plurality of relatively small diameter effusion cooling air holes (not shown) through which pressurized air passes from the plenums 90, 92 into the annular combustion chamber 30. As in conventional practice, the effusion cooling holes may be angled downstream whereby this cooling air not only cools the inboard liner 32 and the outboard liner 34 as it passes therethrough, but also flows along the surface of the liners 32, 34 facing the combustion chamber thereby providing a protective cooling air layer along that surface. This wall cooling air also gradually mixes into the combustion gases passing through the downstream portion of the combustion chamber thereby assisting in shaping the exit temperature profile of the combustion gases leaving the combustor exit to pass through the exit guide vanes and into the turbine. Additionally, the fuel-air mixture is further diluted to the design point overall fuel-air ratio as this wall cooling air gradually mixes with the combustion products prior to the combustion products entering the turbine. The wall cooling air is not considered part of the combustion air per se, which constitutes the primary combustion air admitted through the primary air admission nozzles 40 in the forward bulkhead 36 and the dilution air admitted through the dilution air admission holes 66.68. For example, in a LDI combustion mode, the wall cooling air may constitute about 30% of the overall airflow admitted into the combustion chamber 30 and the combustion air may constitute about 70% of the overall airflow admitted into the combustion chamber.

Figure 2:
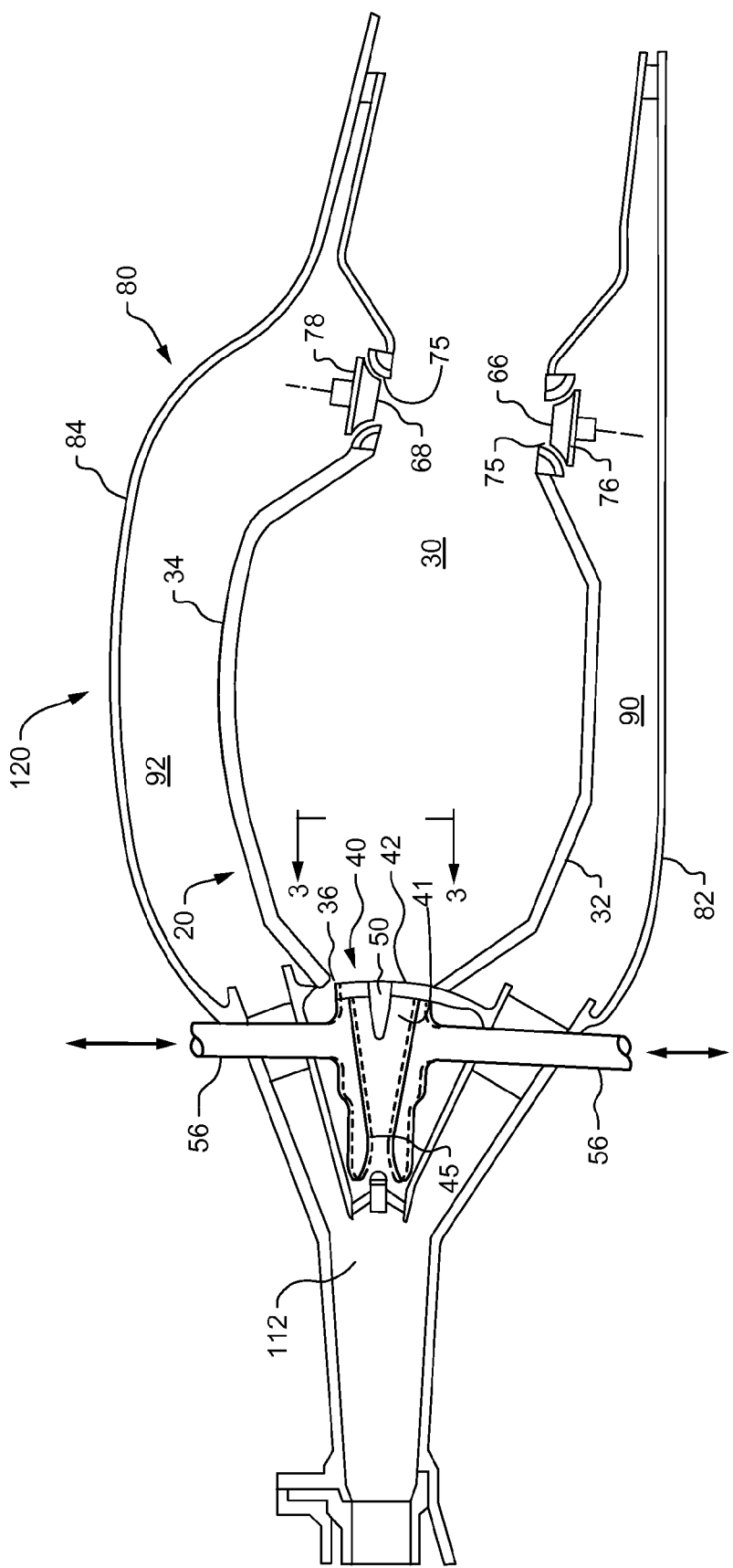
FIG. 2 is a sectioned side elevation view of an exemplary annular combustor according to an aspect of the present invention.

In the annular combustor 20 as disclosed herein, each primary combustion air admission nozzle 40 opening through forward bulkhead 36 for admitting primary combustion air in a forward region, i.e. the primary combustion zone, of the combustion chamber 30 is provided with a selectively variable airflow area geometry. For example, in the depicted embodiment, as best seen in FIG. 2, the flow area geometry of each primary combustion air admission nozzle 40 may be varied by adjustment, inwardly or outwardly, of the mechanism 56 thereby increasing or decreasing the airflow area through the throat 45 of the nozzle 40, which constitutes the choke point in the airflow passage through the nozzle 40. The flow area geometry of the primary combustion air admission nozzle 40 may be selectively varied between a maximum flow area represented by the solid lines in FIG. 2 and a minimum flow area represented by the dashed lines in FIG. 2 by selectively adjusting the mechanism 56 inwardly or outwardly. The flow area geometry of the primary combustion air nozzles 40 may be varied in a continuous manner or in a step-wise manner. It is to be understood that the mechanism 56 is one example of a mechanism for adjusting the flow area geometry of a primary combustion air 40, and that other suitable flow area adjustment mechanisms may be employed.

Additionally, in the annular combustor 20 as disclosed herein, each dilution air admission hole 66, 68 opening through at least one of the inboard and outboard liners 32, 34 is provided with a selectively variable airflow area geometry. For example, in the depicted embodiment, as best seen in FIG. 2, the flow area geometry of each dilution air admission hole 66. 68 may be varied by adjustment, inwardly or outwardly, of a plug 76, 78 thereby increasing or decreasing the airflow area defined by the annular gap 75 between the inside diameter of the hole 66, 68 and the generally conical outside surface of the plug 76, 78. The flow area geometry of each dilution air admission hole may be selectively varied between a maximum flow area when the plug 76, 78 is fully retracted outwardly and a minimum flow area when the plug 76, 78 is positioned fully inwardly so as to "seat" in the hole 66, 68. It is to be understood that when the plug 76, 78 is seated in the hole 66, 68, the flow of air through the hole 66, 68 may not be completely blocked off, rather a relatively small amount of leakage flow may be provided for when the plug 76, 78 is fully seated for the purpose of cooling the plug. The flow area geometry of the dilution air admission holes 66, 68 may be varied in a continuous manner or in a step-wise manner. It is to be understood that the plug 76, 78 is one example of a mechanism for adjusting the flow area geometry of a dilution air hole 66, 68, and that other suitable flow area adjustment mechanisms may be employed.

Gas turbine engines must be capable of operation over a power demand range stretching from a low power demand to a high power demand. For example, in aircraft applications, the gas turbine engine must be capable of operation at a low power demand, such as during idle and runway taxiing, to a high power demand, such as during take-off and climb, as well as at an intermediate power demand, such as during cruise at altitude.

In the method for operating a gas turbine engine as disclosed herein delivery of fuel to the combustor 20 is staged over the power demand range through selectively distributing fuel amongst the primary fuel injectors 50 as in conventional practice, but the flow of primary combustion air admitted into the combustion chamber 30 through the primary combustion air admission nozzles 40 is varied in response to power demand, rather than being maintained as a substantially constant fraction of the total air flow irrespective of the power demand as in conventional practice. More specifically, in the method disclosed herein, the flow of primary combustion air to the primary combustion zone through the primary combustion air admission nozzles 40 is reduced from a maximum air flow rate of high power demand to a minimum flow air rate of low power demand. Simultaneously, the flow of dilution air into the quench zone downstream of the primary combustion zone is increased from a minimum air flow rate at high power demand to a maximum air flow rate at low power demand.

The amount of air admitted into the combustion chamber 30, that is the sum of the primary combustion air flow, the dilution air flow and the cooling air flow, commonly referred to collectively as the burner air flow, may be varied in response to the level of power demand over the operating range of power demand. Typically, the burner air flow varies substantially from a minimum burner air flow at low power demand, for example at idle, to a maximum burner air flow at high power demand, for example at take-off. For example, depending upon engine design and size, the burner air flow may typically vary from low power demand to high power demand by a factor of four or more. In conventional gas turbine combustors, it is customary practice to maintain the percentage of the total air flow admitted to the combustion chamber that is admitted into the primary combustion zone through the primary combustion air admission nozzles at any particular power demand at a constant percentage, typically about 30%, over the entire operating range of power demand. To the contrary, in the method disclosed herein, the distribution of the air admitted to the combustion chamber between the primary combustion zone and the downstream quench zone, that is the relative distribution between the primary combustion air admitted through the primary combustion air admission nozzles 40 and the dilution air admitted through the dilution air admission holes 66, 68 is varied with power demand.

For example, the method may include the steps of: admitting a flow of combustion air into the combustion chamber responsive to power demand; at low power demand, admitting about one-half of that combustion air into the primary combustion zone and admitting about one-half of that combustion air into the quench zone; and at high power demand, admitting substantially all of that combustion air into the primary combustion zone and admitting substantially none of said combustion air into the quench zone. The method may include the further step of: at the intermediate power demand admitting about five-sevenths of that combustion air into the primary combustion zone and admitting about two-sevenths of that combustion air into the quench zone.

In an embodiment, the method includes the steps of: providing a plurality of primary combustion air admission nozzles 40 opening through the bulkhead 36 and having a selectively variable flow area geometry for admitting air into a forward region of the annular combustion chamber 30 and providing a plurality of dilution air admission holes 66, 68 having a selectively variable flow area geometry in at least one of the inboard liner 32 and the outboard liner 34, as in the annular combustor 20 depicted in FIGS. 2-5, and selectively adjusting the variable flow area geometry of plurality of primary combustion air admission nozzles 40 and selectively adjusting the variable flow area geometry of the dilution air admission holes 66, 68 in response to power demand.

For example, at low power demand, such as illustrated in FIG. 4, the variable flow area geometry of each primary combustion air admission nozzle 40 is adjusted to provide a minimum flow area through the throat 45 and the variable flow area geometry of each dilution air admission hole 76, 78 is adjusted to provide a maximum flow area through the annular gap 75 by fully retracting the plug 76, 78 away from the opening defined by the hole 66, 68. At high power demand, such as depicted in FIG. 5, the variable flow area geometry of each primary combustion air admission nozzle 40 is adjusted to provide a maximum flow area through the throat 45 and the variable flow area geometry of each dilution air admission hole 66, 68 is adjusted to provide to a minimum flow area through the gap 75 by fully seating the plug 76, 78 in the opening defined by the hole 66, 68. At an intermediate power demand, the variable flow area geometry of each primary combustion air admission nozzle 40 is adjusted to provide an intermediate flow area at the throat 45, that is a flow area lying between the minimum and maximum flow areas at the throat 45, and the variable flow area geometry of each dilution air admission hole 66, 68 is adjusted to an intermediate flow area through the annular gap 75, that is a flow area lying between the maximum flow area associated with a fully retracted plug 76, 78 and the minimum flow area associated with a seated plug 76, 78.

In the exemplary embodiments depicted, the outboard liner 34 and the inboard liner 32 may be of a double-wall construction and effusion cooled. More specifically, as illustrated in FIG. 3, the outboard liner 34 may be structured with a support shell 44 and one or more associated heat shields 48 secured to the support shell 44 and the inboard liner 32 may be structured with a support shell 54 and one or more associated heat shields 58 secured to the support shell 54. The heat shields 48, 58 may be formed as a circumferential array of panels, each panel having a longitudinal expanse in the axial direction and a lateral expanse in the circumferential direction and a surface that faces the hot combustion products within the combustion chamber 30. Each of the holes 66 in the support shell 54 of the inboard liner 32 has a corresponding hole 66 in the associated heat shield 58. Similarly, each of the holes 68 in the support shell 44 of the outboard liner 34 has a corresponding hole 68 in the associated heat shield 48.

The support shell and heat shields of each of the inboard liner 32 and the outboard liner 34 may be perforated with a plurality of relatively small diameter cooling air holes through which pressurized air passes from the plenums 90, 92 into the annular combustion chamber 30. The cooling holes are much smaller in diameter as compared to the dilution air admission holes 66, 68. The cooling holes may be angled downstream whereby the effusion cooling air not only cools the shell and heat shields of each of the inboard liner 32 and the outboard liner 34 as it passes through the heat shield, but also flows along the surface of the heat shields 48, 58 facing the combustion chamber thereby providing a protective cooling air layer along that surface. The effusion cooling air also gradually mixes into the combustion gases passing through the downstream portion of the combustion chamber thereby assisting in shaping the exit temperature profile of the combustion gases leaving the combustor exit to pass through the exit guide vanes and into the turbine. Exemplary liner and heat shield constructions are described and shown in commonly assigned U.S. Pat. No. 7,093,439, the entire disclosure of which is hereby incorporated herein by reference as if set forth herein. Other embodiments, including single-wall liners, are still within the spirit and scope of the invention.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

I claim:

1. An annular combustor for a gas turbine engine, comprising:
    a diffuser;
    an inboard liner extending circumferentially and extending longitudinally fore to aft;
    an outboard liner extending circumferentially and extending longitudinally fore to aft and circumscribing the inboard liner;
    a bulkhead extending between a forward end of the inboard liner and a forward end of the outboard liner and in cooperation with the inboard liner and the outboard liner defining the annular combustion chamber;
    a plurality of primary combustion air admission nozzles downstream of and operatively coupled with the diffuser, and opening through the bulkhead for admitting air into a forward region of the annular combustion chamber, each air admission nozzle of the plurality of air admission nozzles including a throat having a radially variable flow area geometry by radially translating a mechanism;
    a plurality of first dilution air admission holes formed in the outboard liner at a location downstream of the forward region of the combustion chamber and arranged in at least one circumferential row at circumferentially spaced intervals;
    a plurality of second dilution air admission holes formed in the inboard liner at a location downstream of the forward region of the combustion chamber and arranged in at least one circumferential row at circumferentially spaced intervals;
    wherein a flow area geometry of each dilution air admission hole of the plurality of first dilution air admission holes is variable and additionally, or alternatively, the flow area of each dilution air admission hole of the plurality of second dilution air admission holes is variable; and
    a plurality of plugs having a conically shaped outside surface, each plug of the plurality of plugs operatively associated with a corresponding dilution air admission hole of the plurality of first or second dilution air admission holes to adjust the flow area geometry of the corresponding dilution air admission hole.

2. The annular combustor as recited in claim 1 wherein the radially variable flow area geometry of the throat is variable between a maximum airflow area at high power demand and a minimum airflow area at low power demand.

3. The annular combustor as recited in claim 2 wherein the radially variable flow area geometry of the throat is continuously variable between the maximum airflow area at high power demand and the minimum airflow area at low power demand.

4. The annular combustor as recited in claim 2 wherein the radially variable flow area geometry of the throat is step-wise variable between the maximum airflow area at high power demand and the minimum airflow area at low power demand through at least one intermediate airflow area at an intermediate power demand.

5. The annular combustor of claim 1 wherein each air admission nozzle of the plurality of air admission nozzles further includes an air passage downstream of the throat, and a fuel injector circumferentially surrounded by the associated air passage, the fuel injector located downstream of the throat and extending along the centerline of the air admission nozzle.

6. The annular combustor of claim 2 wherein radially translating the mechanism causes a narrowing of the throat at low power demand and a widening of the throat at high power demand.

7. The annular combustor of claim 6 wherein the narrowing of the throat creates the minimum airflow area at low power demand and the widening of the throat creates the maximum airflow area at high power demand.

8. The annular combustor as recited in claim 1 wherein the plurality of second dilution air admission holes is offset circumferentially from the plurality of first dilution air admission holes.

9. The annular combustor of claim 1 wherein at least one of the plurality of first dilution air admission holes is circumferentially aligned with the fuel injector.

10. The annular combustor of claim 1 wherein at least two of the plurality of second dilution air admission holes are circumferentially located between each of the plurality of air admission nozzles.

* * * * *